W. HARDICK.
TURNBUCKLE.
APPLICATION FILED FEB. 13, 1914.
1,110,201. Patented Sept. 8, 1914.
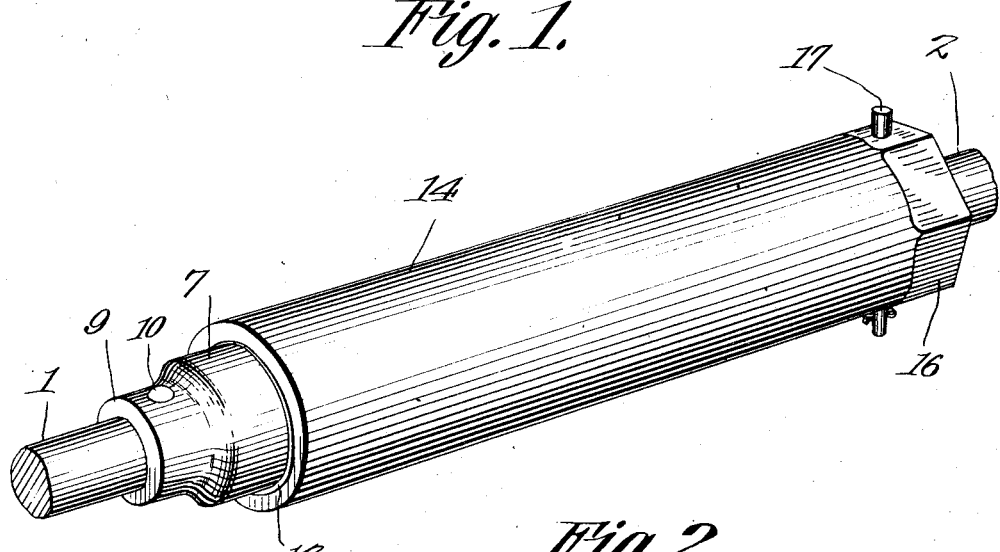
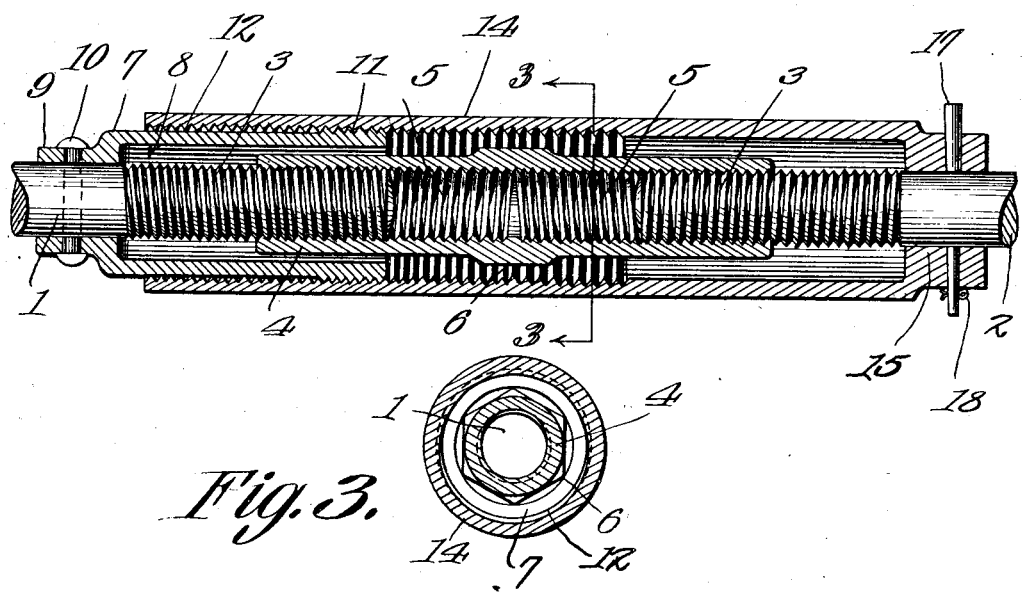
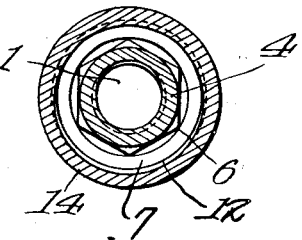
William Hardick
Inventor,
by C. A. Snow & Co.
Attorneys.
Witnesses

UNITED STATES PATENT OFFICE.

WILLIAM HARDICK, OF CADILLAC, MICHIGAN, ASSIGNOR OF ONE-HALF TO LEROY A. OGDEN, OF GRAND RAPIDS, MICHIGAN.

TURNBUCKLE.

1,110,201.  Specification of Letters Patent.  Patented Sept. 8, 1914.

Application filed February 13, 1914. Serial No. 818,544.

*To all whom it may concern:*

Be it known that I, WILLIAM HARDICK, a citizen of the United States, residing at Cadillac, in the county of Wexford and State of Michigan, have invented a new and useful Turnbuckle, of which the following is a specification.

The device forming the subject matter of this application is a turnbuckle and one object of the invention is to provide a turnbuckle into which water and moisture cannot find its way.

Another object of the invention is to provide a turnbuckle which will not only be moisture and weather-proof but, at the same time, will permit the use of rods of common and ordinary construction, it being unnecessary to turn down or weaken any portion of either rod, or to do any machine work thereon, other than threading the ends of the rods.

It is within the scope of the invention to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:—Figure 1 is a perspective illustrating a turnbuckle embodying the present invention; Fig. 2 is a longitudinal section of the device shown in Fig. 1; Fig. 3 is a transverse section taken on the line 3—3 of Fig. 2.

In the accompanying drawings the numerals 1 and 2 indicate rods, the rods being right and left hand threaded at their adjacent ends, as indicated at 3. The invention includes a tube 4 which is right and left hand threaded as shown at 5 to receive the threaded portions 3 of the rods 1 and 2. The tube 4 is imperforate from end to end, in order that moisture cannot find its way into the interior of the tube. To facilitate the rotation of the tube 4, the same is provided externally and intermediate its ends with a polygonal, wrench receiving portion 6.

The invention includes a primary sleeve 7, spaced as indicated at 8 from the tube 4, in order to receive the tube and its wrench receiving portion 6, when the tube is rotated. The primary sleeve 7 terminates in a reduced collar 9 surrounding the rod 1 closely, and a securing device 10 unites the collar portion 9 of the primary sleeve 7 with the rod 1 permanently, the securing device being a rivet or other element adapted to a like end. The primary sleeve 7 is externally threaded adjacent its inner end, as shown at 11, for a short distance, to coöperate with extensive internal threads 12 formed upon a secondary sleeve 14, provided with a collar 15 embracing the rod 2 closely, the collar 15 being provided with polygonal, external, wrench faces 16. A tapered pin 17 extends through the collar 15 and engages the rod 2 and, in order to hold the tapered pin 17 in place, a cotter pin 18 may be passed therethrough, the cotter pin coöperating with the external surface of the collar 15.

In practical operation, the tube 4 is turned up until the rods 1 and 2 are tightened sufficiently. Then the secondary sleeve 14 is threaded onto the primary sleeve 7, to house the tube 4, and finally, the tapered pin 17 is mounted in place and retained by the cotter pin 18. The threads 12 on the secondary sleeve 14 are of sufficient length so that the pin 17 may always be inserted through the rod 2, irrespective of the relations existing between the ends of the rods 1 and 2 and the tube 4.

It is to be observed that the tube 4, the primary sleeve 7 and the secondary sleeve 14 are all devoid of openings, and consequently, it will be practically impossible for water to find its way into the interior of the structure. Especial attention is directed to the fact that the secondary sleeve 14 is threaded onto the primary sleeve 7 and not onto the rod 1. Owing to this construction, the diameter of the rod 1 need not be altered. The rod 1 may be of a common diameter from end to end and it is unnecessary to turn down the rod to form a shoulder adapted to receive the sleeve 14, this operation, obviously, causing added machine work and serving to weaken the rod.

Having thus described the invention, what is claimed is:—

1. A turnbuckle comprising oppositely threaded rods; a tube receiving the threaded portions of the rods; a primary sleeve secured to one rod and spaced therefrom to receive the tube; a secondary sleeve threaded upon the primary sleeve; and means for detachably securing the secondary sleeve to the other rod.

2. A turnbuckle comprising oppositely threaded rods; a tube receiving the threaded portions of the rods and provided intermediate its ends with a polygonal, wrench receiving portion, each rod being of a common diameter from its inner end to a point beyond the corresponding end of the tube; a primary sleeve spaced from one rod to receive the tube and having a reduced collar engaging said rod; a securing device permanently connecting the collar with said rod; a secondary sleeve threaded onto the outer face of the primary sleeve and having a collar embracing the other rod closely, the collar being of externally polygonal contour; a tapered pin passed through the collar of the secondary sleeve and through the last specified rod; and a securing pin extending through the tapered pin and coöperating with the collar of the secondary sleeve to hold the tapered pin in place.

3. A turnbuckle comprising oppositely threaded rods; a tube receiving the threaded portions of the rods; a primary sleeve surrounding one rod and spaced therefrom to receive the tube; a secondary sleeve surrounding the other rod and receiving the end of the primary sleeve; and separate means for securing the sleeves to the respective rods, one of said means being releasable.

In testimony that I claim the foregoing as my own, I have hereto affixed my signature in the presence of two witnesses.

WILLIAM HARDICK.

Witnesses:
SELINA WILLSON,
I. E. SIMPSON.